J. P. CLEAL & J. G. FLETCHER.
CLUTCH MECHANISM.
APPLICATION FILED MAY 6, 1911.
1,034,690.
Patented Aug. 6, 1912.
2 SHEETS—SHEET 1.
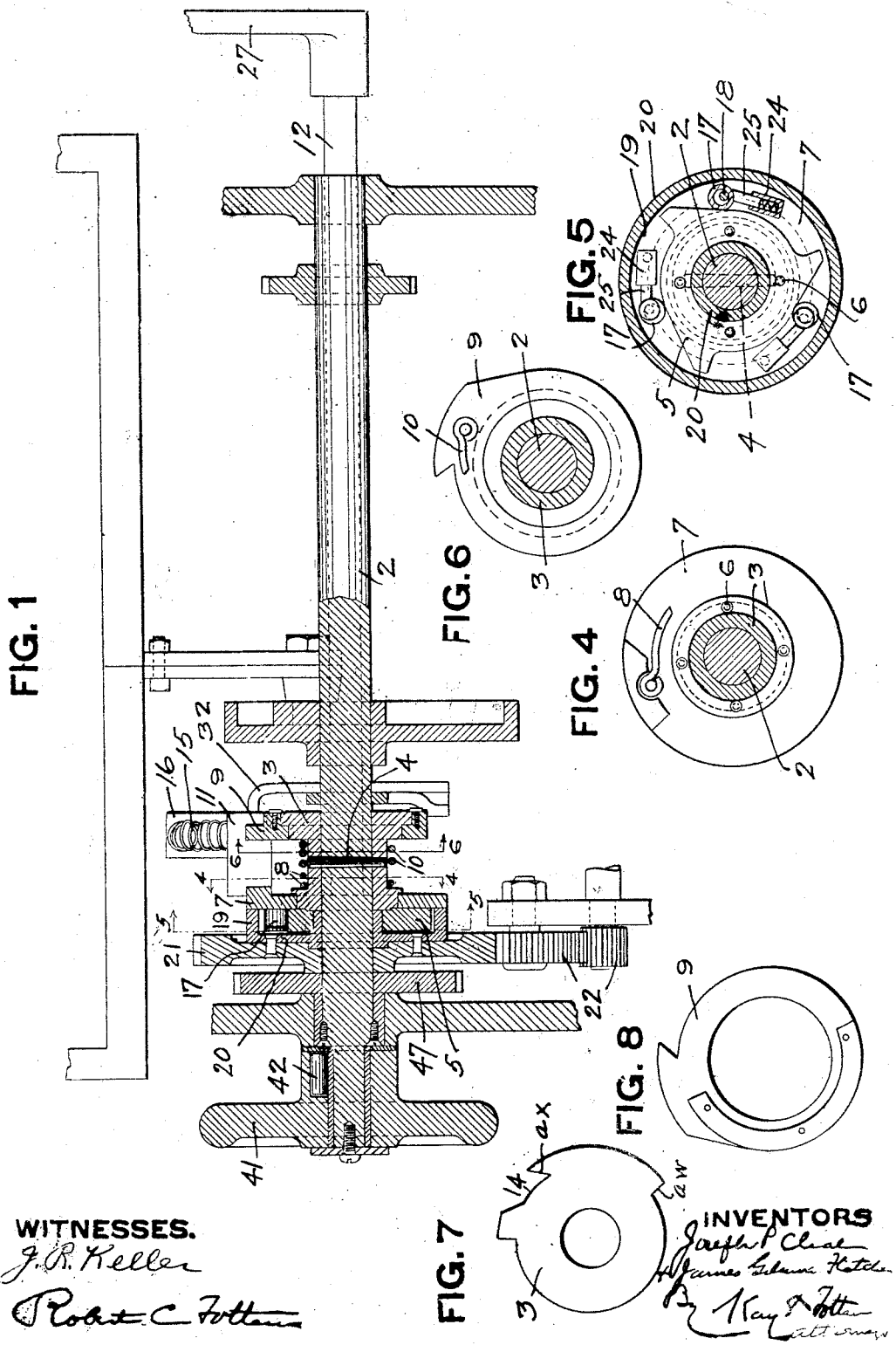
WITNESSES.
J. R. Keller
Robert C. Totten
INVENTORS
Joseph P. Cleal
James Gilman Fletcher
By Kay & Totten
Attorneys J. P. CLEAL & J. G. FLETCHER
CLUTCH MECHANISM.
APPLICATION FILED MAY 6, 1911.
1,034,690.
Patented Aug. 6, 1912.
2 SHEETS—SHEET 2.
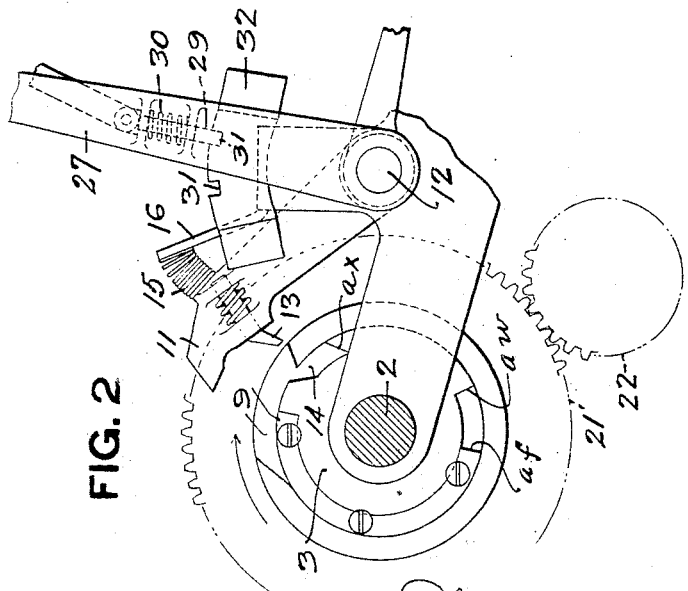
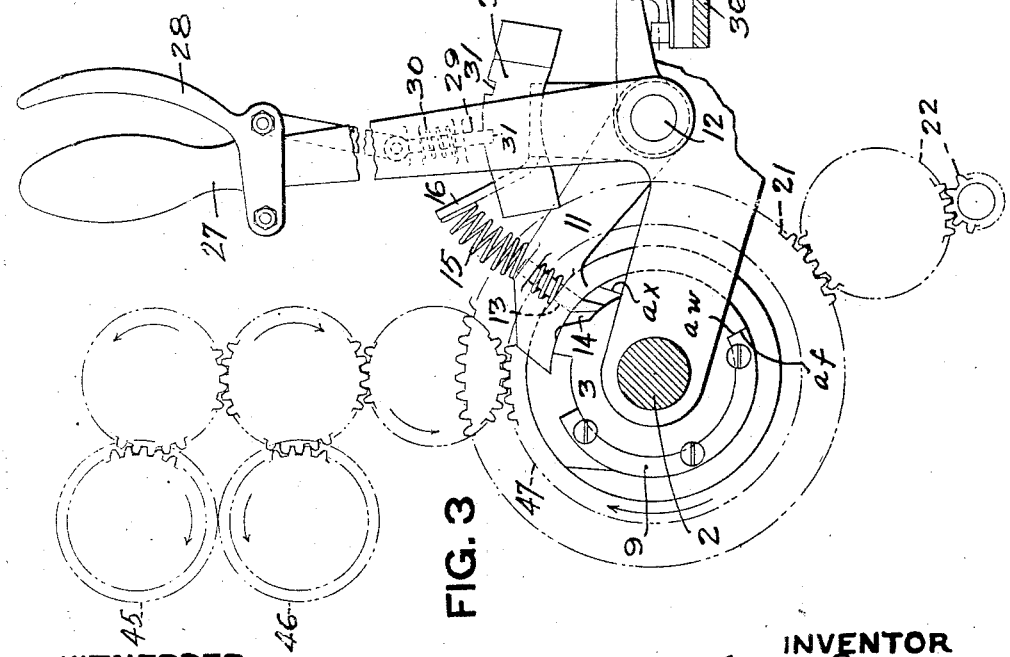
WITNESSES.
INVENTOR

UNITED STATES PATENT OFFICE.

JOSEPH P. CLEAL, OF TORONTO, ONTARIO, CANADA, AND JAMES GILMORE FLETCHER, OF PITTSBURGH, PENNSYLVANIA.

CLUTCH MECHANISM.

1,034,690. Specification of Letters Patent. Patented Aug. 6, 1912.

Application filed May 6, 1911. Serial No. 625,537.

*To all whom it may concern:*

Be it known that we, JOSEPH P. CLEAL, a citizen of the United States, and resident of Toronto, in the Province of Ontario, Canada, and JAMES GILMORE FLETCHER, a citizen of the United States, and resident of Pittsburgh, in the county of Allegheny, State of Pennsylvania, have invented a new and useful Improvement in Clutch Mechanism; and we do hereby declare the following to be a full, clear, and exact description thereof Our invention relates to clutch mechanism.

The object of our invention is to provide a form of clutch mechanism for use, for instance, in connection with printing rolls by means of which the rolls may be stopped automatically at a predetermined position so that the printing rolls are brought to a standstill at the same predetermined point each time so that they will always be in proper position to print upon the matter as it passes through the printing rolls.

To these ends our invention comprises the novel features hereinafter set forth and claimed.

In the accompanying drawings Figure 1 is a longitudinal vertical section through the driving and clutch mechanism; Fig. 2 is a section showing the pawl out of engagement; Fig. 3 is a like section showing the pawl in engagement; Fig. 4 is a section on the line 4—4 Fig. 1 and Fig. 5 is a section on the line 5—5 Fig. 1. Fig. 6 is a section on the line 6—6 Fig. 1. Fig. 7 is an end view of the clutch member and Fig. 8 is a face view of one of the stop rings.

In the drawings the numeral 2 designates a suitable power line shaft driven by a suitable motor and mounted in suitable bearings in the frame. A clutch member 3 is mounted on the shaft and is secured to said shaft by the dowel pin 4 which causes said clutch member 3 to rotate with said shaft. This clutch member 3 is connected up to the locking plate 5 by means of rivets 6. A clench plate 7 engages and works freely upon the clutch member 3 and one end of a spiral spring 8 is made fast to the clench plate 7 and the other end to the clutch member 3. A stop-ring 9 also runs freely on the clutch member 3 and one end of a spring 10 is made fast to the stop-ring 9 and the other end to the clutch member 3. This spring 10 moves the stop-ring 9 forward when the stop pawl 11 is raised out of its path. The stop-pawl 11 being fast on a shaft 12 and adapted to rock by the movement of said shaft so that its forward and outer end is raised upward and out of the path of the clench plate 9, whereupon said plate is impelled forward by the spring 8. The pawl 11 is provided with the latch 13 which is adapted to enter the notch 14 in the stop-ring 9 when the stop-pawl 11 has been thrown into position to catch the projection of the clench-plate 7 and stop-ring 9 which moves the clench plate forward. A spring 15 is interposed between the top of the stop pawl 11 and a bracket 16 and incidentally helps to keep it from vibrating in its downward position. The clench-plate 7 carries three hardened rollers 17 fitting loosely to play upon studs 18 which are made fast to it and these rollers are forced up an incline plane or locking plate 5. The incline plane forces the rollers 17 on the clench-ring 7 downward and against the flange 19 of the clench-ring 20 secured to the gear 21 thus wedging it between the incline plane and the inside of the flange of the clench ring 20. The ring 20 is made fast to the gear 21 which acts as unit secured to power line shaft 2 driven by the motor through a suitable train of gears 22. It is obvious that the wedging of the rolls on the clench-plate 7 will impart the motion of the gear 21 to the power-shaft 2 through the agency of this clutch mechanism which is made fast to power shaft 2 by the dowel pin 4.

On the clench-plate 7 there are three small spring stops 24 provided with plungers 25. These stops are placed in the position shown in the drawing and fast to clench-plate 7 for the purpose of normally keeping the floating clench rollers 17 out in the widest space between clench-ring 20 and locking plate 5 when the clutch gear 21 is running free. In this manner the tendency is to keep the rollers 17 from catching at any time except when the clench-ring 7 is thrown forward by its spring and forces said rollers into operative connection between the clench-ring 20 and locking plate 5. The motion of the stop-ring 9 in the backward direction is limited and at a certain point it becomes a part of the shaft 2. The spring 10 is used as a counter retardation and acts to check the speed of the shaft 2 before the front end of the pawl 11 has pushed the stop-ring 9 around to the point where it becomes a part of the shaft 17, when the pawl 11 is rocked forward and downward, the lock entering the latch 14 and thereby preventing the stop 9 from allowing the shaft 2 to rebound.

For convenience of operation in starting and stopping the machine in connection with which our improved clutch is employed, we employ the starting lever 27 with the flexible grip 28. The locking bar 29 is pivoted to the hand grip 28, and it will be obvious that by pressing the hand grip 28 in the direction of the starting handle 27 the lock-bar 29 will be raised against the tension of the spring 30 which has been holding the lock bar 29 in its lowermost position with its end in one or other of the two bar notches 31 in the bracket 32. One of the locking bar notches 31 holds the starting handle 27 in position to start the machine and the other in position to stop it. When the starting handle 27 is pulled back it rocks the shaft 12 to which it is made fast causing electrical contact to be made by contact lever 33, being rocked down to press the contact piece 34 upon the contact points 35 which in turn are made fast to the bracket 36. To one of these contact pieces 34 is attached a positive electric wire and to the other contact point 35 is attached a negative electric wire, the main line coming in the one and going out the other end of the motor, thus making and breaking the circuit every time the starting handle is moved forward or backward.

From the above it will be apparent that upon throwing the pawl 11 out of engagement with the clench-plate 7 and stop-ring 9, the springs 8 and 10 will act to rotate the said clench-plate and stop-ring, and the operation of the clench-plate 7 will carry the clench-rollers 17 into engagement with the flange of the clench-ring 20 so that the clutch-gear 21 running loosely on the shaft 2 is made fast to said shaft through the clutch-member 3. The clutch-gear 21 would of course drive the shaft 2 in the same direction as said gear has been traveling. When the pawl 11 is thrown down to engage the clench plate 7 and stop-ring 9 as indicated in Fig. 3, said pawl will engage the extension of clench-plate 7 and stop-ring 9. As all the parts are moving in the direction of the arrow Fig. 2 it will be readily understood that this action causes the clench-plate 7 to carry the floating rollers 17 out of operative connection with the locking plate 5 and clench-plate 20, thereby allowing the clench-ring 20 to slip free at the same time the shaft 2 is moved forward to the limit determined by stop-ring 9.

By referring to Fig. 2 of the drawing *af* represents the extension on the stop-ring 9 and *aw* represents the projection on clutch-member 3 which it is to be remembered is made fast to the shaft. It will be apparent that the space between these two projections is open and that the shaft 2 moving in the direction of the arrow will cause the projection or clutch-member 3 at *aw* to move around until it contacts with the projection or stop-ring 9 at *af*. This stop-ring 9 is held in a fixed position by the locking pawl 11 as previously described and it will be readily understood that when this limit of movement is reached the shaft 2 must come to a standstill or the crank must break. When the limit of movement is reached the catch-pin 13 drops into the notch or clutch-member at *ax* which prevents the shaft 2 from rebounding in the opposite direction to which it has been running.

It will be noted by referring to Fig. 3 that when the machine has been stopped and the parts are normal there is a small space between the notch face at *ax* on the clutch-member 3 and the catch-pin 13 in the locking pawl 11. This space is to make certain the movement of the catch pin 13 downward so that there can be no possibility of the catch pin failing to operate and perform its function, *i. e.*, that of preventing the rebounding of the power shaft 2. A hand-wheel 41 is made to move the machine in one direction, but to turn freely in the opposite direction. To accomplish this a clutch-roll 42 is placed in the hub of the hand-wheel and this works in a hardened sleeve on the shaft 2. The slot cut in the hand-wheel 41 is beveled so that when the hand-wheel is turned in one direction the roll 42 is moved in the wider part of the slot and the hand-wheel moves loosely on the shaft. When the hand-wheel is turned in the opposite direction the clench-roll 42 is moved into the narrow part of the slot and is pushed between the two passing surfaces of the top of the slot in the hand-wheel and the hardened bushing. By the above form of mechanism provision is made for stopping the power-shaft so as to bring the printing rolls 45 and 46 to a standstill at the same predetermined point each time so that they will always be in proper position to print on the object as it passes through the printing roll. In Fig. 3 we have illustrated a train of gearing connecting up the gear-wheel 47 on the shaft 2 with the rolls for driving the same.

It is of course to be understood that we do not limit ourselves in any way to the particular kind of mechanism in connection with which our improved clutch device is to be employed and have only illustrated it in its connection with printing rolls diagrammatically for purposes of illustration.

What we claim is:

1. In clutch mechanism, the combination of a shaft, a clutch member secured to said shaft, a loosely mounted driving member on said shaft, a spring actuated locking member rotary on said clutch member, means for connecting said loosely mounted driving member with said clutch member by the action of said locking member, and means for releasing said locking member.

2. In clutch mechanism, the combination of a shaft, a loosely mounted driving-member on said shaft, a clutch-member secured to said shaft, a spring actuated rotary locking-member on said clutch-member, a rotary stop-ring on said clutch member, a spring connecting said stop-ring to said clutch-member, and a pawl engaging said rotary-member and said stop ring, whereby when said pawl is withdrawn said locking-member is brought into engagement with said loosely mounted driving-member.

3. In clutch mechanism, the combination of a shaft, a loosely mounted driving member on said shaft, a clutch-member secured to said shaft, a spring actuated rotary locking member on said clutch-member, a locking plate on said clutch-member, radially movable rollers on said rotary member adapted to be forced between said locking-plate and said driving member and means for releasing said rollers.

4. In clutch mechanism, the combination of a shaft, a loosely mounted driving-member on said shaft, a clutch-member secured to said shaft, a spring actuated rotary locking member on said clutch-member, said driving member having a flange portion, a locking plate on said clutch-member, radially movable rollers on said rotary-member adapted to be forced between said locking plate and said flange portion of said driving member and means for releasing said rollers.

5. In clutch mechanism, the combination of a shaft, a loosely mounted driving-member on said shaft, a clutch-member secured to said shaft, a rotary locking-member on said clutch member, a rotary stop-ring on said clutch-member, a spring connecting said stop-ring to said clutch-member, a pawl engaging said rotary locking member and said stop ring, a locking-device on said clutch member, means for throwing said last named locking-device and said rotary locking member into engagement with said loosely mounted driving member by the withdrawal of said pawl, and a latch on said pawl adapted to engage said clutch member.

In testimony whereof, we the said JOSEPH P. CLEAL and JAMES GILMORE FLETCHER have hereunto set our hands.

JOSEPH P. CLEAL.
JAMES GILMORE FLETCHER.

Witnesses to Cleal:
  D. S. TOVELL,
  H. M. CHRISTMAN.

Witnesses to Fletcher:
  ROBERT C. TOTTEN,
  JOHN F. WILL.